United States Patent
Fornof et al.

(10) Patent No.: US 10,282,583 B2
(45) Date of Patent: May 7, 2019

(54) FINGERPRINT IMAGING SYSTEMS COMPRISING SELF-WETTING ADHESIVE, FILMS AND METHODS

(71) Applicant: GEMALTO SA, Meudon (FR)

(72) Inventors: Ann R. Fornof, St. Paul, MN (US); Duane D. Fansler, Dresser, WI (US); Kui Chen-Ho, Woodbury, MN (US); James P. DiZio, St. Paul, MN (US); Kiran S. Kanukurthy, Cottage Grove, MN (US); John C. Hulteen, Afton, MN (US); Stephen A. Johnson, Woodbury, MN (US); Onur Sinan Yordem, St. Paul, MN (US)

(73) Assignee: GEMALTO SA, Meudon (FR)

( * ) Notice: Subject to any disclaimer, the term of this patent is extended or adjusted under 35 U.S.C. 154(b) by 34 days.

(21) Appl. No.: 15/381,294

(22) Filed: Dec. 16, 2016

(65) Prior Publication Data

US 2017/0177921 A1  Jun. 22, 2017

Related U.S. Application Data

(60) Provisional application No. 62/270,839, filed on Dec. 22, 2015.

(51) Int. Cl.
    *G06K 9/00* (2006.01)
(52) U.S. Cl.
    CPC .................. *G06K 9/00046* (2013.01)
(58) Field of Classification Search
    CPC .................................. G06K 9/00046
    See application file for complete search history.

(56) References Cited

U.S. PATENT DOCUMENTS

| | | |
|---|---|---|
| 2,676,182 A | 4/1954 | Daudt |
| 3,627,851 A | 12/1971 | Brady |
| 3,772,247 A | 11/1973 | Flannigan |
| 4,152,387 A | 5/1979 | Cloeren |
| 4,197,069 A | 4/1980 | Cloeren |
| 4,379,806 A | 4/1983 | Korpman |
| 4,600,550 A | 7/1986 | Cloren |
| 4,619,802 A | 10/1986 | Cloeren |
| 4,780,258 A | 10/1988 | Cloeren |
| 4,789,513 A | 12/1988 | Cloeren |
| 5,096,290 A | 3/1992 | Ohta |
| 5,248,739 A | 9/1993 | Schmidt |

(Continued)

FOREIGN PATENT DOCUMENTS

| | | |
|---|---|---|
| CN | 2921960 | 7/2007 |
| JP | H09259248 | 10/1997 |

(Continued)

OTHER PUBLICATIONS

Encyclopedia of Polymer Science and Engineering, vol. 15, John Wiley & Sons, New York, (1989), pp. 265-270.

*Primary Examiner* — John B Strege

(74) *Attorney, Agent, or Firm* — The Jansson Firm; Pehr B. Jansson

(57) ABSTRACT

A fingerprint imaging system is described comprising a film including an optically transparent self-wetting adhesive layer adhered to an imaging surface of an electronic optical image sensor. Also described is a method of use of an optical imaging system, and a film and multilayer film suitable for use with a fingerprint imaging system.

36 Claims, 3 Drawing Sheets

(56) References Cited

U.S. PATENT DOCUMENTS

| | | | |
|---|---|---|---|
| 5,623,010 A | 4/1997 | Groves | |
| 5,660,992 A | 8/1997 | Dasgupta | |
| 5,677,376 A | 10/1997 | Groves | |
| 6,154,285 A | 11/2000 | Teng | |
| 6,259,108 B1 | 7/2001 | Antonelli | |
| 6,310,683 B1* | 10/2001 | Fujiwara | G06K 9/0004 250/556 |
| 6,730,397 B2 | 5/2004 | Melancon | |
| 7,319,565 B2 | 1/2008 | Arnold | |
| 7,366,331 B2* | 4/2008 | Higuchi | G06K 9/00046 340/5.53 |
| 7,501,184 B2 | 3/2009 | Leir | |
| 7,515,252 B2 | 4/2009 | Hernandez | |
| 7,798,405 B2* | 9/2010 | Ni | G06K 9/00046 235/454 |
| 7,807,268 B2 | 10/2010 | Zhou | |
| 8,570,149 B2 | 10/2013 | Rowe | |
| 9,007,175 B2 | 4/2015 | Rowe | |
| 9,854,141 B2* | 12/2017 | Chang Chien | H04N 5/2254 |
| 2007/0153258 A1 | 7/2007 | Hernandez | |
| 2008/0317303 A1* | 12/2008 | Konno | G06K 9/2027 382/124 |
| 2010/0113952 A1 | 5/2010 | Raguin | |
| 2011/0109957 A1* | 5/2011 | Ylitalo | A61L 9/20 359/359 |
| 2011/0123800 A1 | 5/2011 | Sherman | |
| 2012/0062364 A1 | 3/2012 | Rowe | |
| 2012/0100326 A1 | 4/2012 | Sherman | |
| 2014/0030518 A1* | 1/2014 | Jo | C09J 183/06 428/355 AC |
| 2014/0065397 A1 | 3/2014 | Johnson | |
| 2014/0267944 A1 | 9/2014 | Ikeda | |
| 2014/0358104 A1 | 12/2014 | Tse | |
| 2015/0146944 A1* | 5/2015 | Pi | H04L 63/0861 382/124 |
| 2015/0293591 A1* | 10/2015 | Yairi | G06F 3/0416 345/173 |
| 2016/0092717 A1* | 3/2016 | Ling | G06K 9/0004 382/125 |
| 2016/0117543 A1* | 4/2016 | Huang | G02B 5/0278 382/124 |
| 2016/0125220 A1* | 5/2016 | Lundahl | G06K 9/0002 382/124 |
| 2017/0235995 A1* | 8/2017 | Han | G06K 9/0004 382/124 |

FOREIGN PATENT DOCUMENTS

| | | |
|---|---|---|
| JP | 2011102400 | 5/2011 |
| WO | WO 1998-15601 | 4/1998 |
| WO | WO 1999-03907 | 1/1999 |
| WO | WO 2009-085662 | 7/2009 |
| WO | WO 2010-132176 | 11/2010 |

* cited by examiner

FINGERPRINT IMAGING SYSTEMS COMPRISING SELF-WETTING ADHESIVE, FILMS AND METHODS

BACKGROUND

As described for example in US2007/0153258, electronic fingerprint acquisition systems have been introduced to eliminate the need to use ink or a chemical reagent. In such systems, the subject's fingertip is placed in contact with a transparent platen. Light is directed through the platen and is reflected from the fingertip to an electronic image sensor. The image of the fingerprint is acquired and may be digitized, analyzed, printed, stored, transmitted, or compared with a previously captured fingerprint.

Fingerprint identification involves the comparison of the many minute and unique characteristics of each person's fingerprint, including the pattern of ridge endings and ridge bifurcations and locations and directions of these features, known in the art as minutiae. Comparisons between an unknown fingerprint and fingerprints of known persons may be accomplished manually or by an electronic system. The process of matching an unknown fingerprint to known fingerprints requires the correlation of a minimum number of minutiae for accurate comparison. In the absence of sufficient clarity and resolution of an acquired fingerprint image, a comparable match may be difficult to make.

In typical devices, a fingerprint image is produced when some incident light from a light source passes through the platen and is reflected at portions of the second layer beneath valleys of the fingertip due to a difference in refractive index between the second layer and air above the second layer. The reflected light associated with the valleys of the fingertip is received by an electronic image sensor. Incident light is generally absorbed at portions of the second layer in contact with ridges of the fingertip.

A large variety of electronic fingerprint imaging devices have been proposed in the art. Many fingerprint imaging devices have a relatively costly platen that is integrated into the device. The platen typically includes an optically transparent rigid first layer covered by a second layer that deforms under pressure from the ridges of the fingertip pressed against it. The deformations under the ridges cause the incident light that is reflected beneath the fingertip ridges to disperse, which desirably reduces the amount of reflected light associated with the ridges from entering the electronic image sensor, thereby making it easier for the imaging device to distinguish between ridges and valleys.

A large variety of electronic fingerprint imaging devices have a common problem of platen maintenance. It is a completely natural and unavoidable occurrence that oil and dirt accumulate on the platen during its use. Environmental conditions such as blowing dust and ultraviolet light can also contribute to a build-up of dirt, grease, or damage on the surface of the platen that obscures fingerprint images. Attempts to clean a dirty platen with a tissue may permanently abrade the surface of the platen and further obscure fingerprint images.

When there are scratches, pits, or other defects on an exterior surface of the platen the incident light that is reflected beneath the fingertip valleys is dispersed reducing the amount of reflected light associated with the valleys entering the electronic image sensor, making it difficult or impossible for the imaging device to accurately identify minutiae on the fingerprint.

In addition to the inconvenience and cost of replacement, scratches, pits, or other defects on the surface of the platen can have a detrimental impact on workflow. For example, healthcare professionals may utilize electronic fingerprint imaging devices for access to controlled medications.

US2007/0153258 (Abstract) describes an optical fingerprint imaging system comprising an optically transparent platen and a protective film removably attached to the platen with an adhesive. The protective film protects the platen from scratches, pits, and other surface damage and is substantially chemically inert to petroleum-based substances which may come into contact when receiving a finger pressed to take a fingerprint image. The adhesive has a selected cohesive strength that allows the protective film and adhesive to be removed from the platen without leaving behind an adhesive residue. The protective film can be replaced periodically as part of maintenance of the platen to allow continued acquisition of accurate fingerprint images. A method for protecting a platen is also disclosed.

SUMMARY

In one embodiment, a fingerprint imaging system is described comprising a film comprising an optically transparent self-wetting adhesive layer adhered to an imaging surface of an electronic optical image sensor.

In another embodiment, a method of use of an optical imaging system is described comprising providing a film comprising a self-wetting adhesive; and adhering the self-wetting adhesive to an imaging surface of an optical image sensor.

In another embodiment, a film suitable for use with a fingerprint imaging system is described comprising a self-wetting adhesive layer disposed on a major surface of a substrate layer; and a skin contact layer comprising a different composition than the self-wetting adhesive layer disposed on the opposing surface of the substrate.

In yet other embodiment, multilayer film suitable for use with a fingerprint imaging system are described.

DETAILED DESCRIPTION

The present invention relates to films for fingerprint imaging system and methods of use.

The fingerprint imaging system is designed for imaging a body site, such as a fingerprint, by contact with a skin contact layer integrated with the device. Most commonly, such devices are used for imaging a "fingerprint" meaning a single fingerprint or multiple fingerprints. As used herein, "fingerprint imaging system" further includes other body sites that may be imaged in the same manner such as other surfaces of the hand including the palm or thumb.

Fingerprint imaging systems generally comprise an optical image sensor that captures light images from a lens assembly and converts them to electrical signals. The image sensor can be a charge coupled device ("CCD") or any other means of converting a light signal into either an analog or digital electrical signal. In some embodiments, the image sensor is a complementary metal oxide semiconductor device ("CMOS"). CCD and CMOS image sensors are known image sensors in the art.

Various configurations of illumination and imaging can be utilized including TIR imaging, direct imaging, TIR illumination, and direct illumination. The term "total internal reflectance (TIR) imaging" refers to a method of imaging wherein the optical axis of the imaging system lies at an angle relative to the normal of the sensor imaging surface and that is greater than the optical critical angle of that surface.

Figure 1:
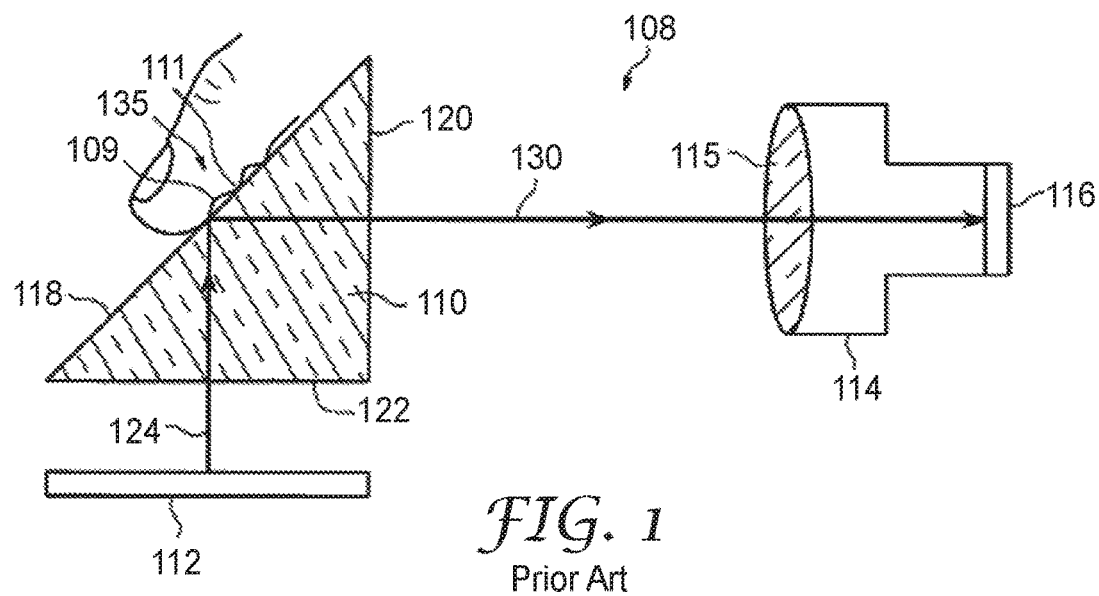
FIG. 1 is a schematic side view of an illustrative fingerprint imaging system; (from U.S. Pat. No. 6,154,285)

One representative fingerprint imaging system 108, depicted in FIG. 1, includes a light source 112, an optical prism 110, and a light detector 114. The prism 110 includes an imaging surface 118, a light receiving surface 122, and a viewing surface 120. Imaging surface 118 is the surface where a fingerprint or other body site is placed for imaging. The light source 112, which may, for example, include one or more light emitting diodes (LEDs), is placed adjacent to light receiving surface 122 and generates incident light 124 that is transmitted to the optical prism 110.

Generally, incident light 124 strikes imaging surface 118 and can either pass through, reflect from, or scatter off of imaging surface 118 to form an image of fingerprint 135. Reflected and/or scattered light 130 passes out of viewing surface 120 of prism 110 and through light detector 114 located adjacent to viewing surface 120. Light detector 114 may contain one or more optical lenses 115 and an image sensor 116 for capturing optical light images and converting them into electrical signals. Such an image sensor 116 could include, for example, a charge coupled device (CCD) or a complementary metal oxide semiconductor (CMOS) chip. The electrical signals can be processed by processing electronics and/or software (not shown) and stored in a form to allow comparison with other fingerprint images.

As shown in FIG. 1, fingerprint 135 has both valleys 109 and ridges 111. There are at least two methods by which an image capturing system such as system 108 can image valleys 109 and ridges 111 of fingerprint 135. Both methods rely on a fingerprint ridge 111 being in contact with imaging surface 118 and a fingerprint valley 109 being above and out of contact with imaging surface 118. In a first method, known as an "absorption" method, incident light 124 which strikes a region of imaging surface 118 where a fingerprint ridge 111 is in contact therewith is substantially absorbed or scattered by ridge 111. Incident light 124 which strikes a region of imaging surface 118 where there is a fingerprint valley 109, however, is totally internally reflected from imaging surface 118 to enter light detector 114. A portion of the absorbed and/or scattered light from fingerprint ridges 111, however, is not picked up by light detector 114. Accordingly, in an absorption system, the image of fingerprint 135 is relatively bright at fingerprint valleys 109 and relatively dark at fingerprint ridges 111.

In a second method, known as a scattering method, incident light 124 is projected onto imaging surface 118 such that in regions of a fingerprint ridge 111, incident light 124 is scattered into prism 110 and in regions of a fingerprint valley 109, incident light 124 substantially passes through imaging surface 118. Light detector 114 picks up the scattered light and does not pick up the light which passes through imaging surface 118. Thus, in a scattering system, the image of a fingerprint 135 is relatively dark at fingerprint valleys 109 and relatively bright at fingerprint ridges 111.

In either a scattering system or an absorption system, the ability of an image capture system to create a high contrast, accurate fingerprint image is dependent upon the fingerprint ridges 111 touching the imaging surface 118 and fingerprint valleys 109 not touching imaging surface 118. Specifically, in an absorption system, it is the contact between the fingerprint ridge 111 and imaging surface 118 which causes the absorption and/or scattering of incident light 124 and the lack of contact between a fingerprint valley 109 and the imaging surface 118 which allow total internal reflection of incident light 124 to create an image of the fingerprint 135. In a scattering system, it is the contact between a fingerprint ridge 111 and imaging surface 118 which causes incident light 124 to be scattered into lens assembly 114 and the lack of contact between a fingerprint valley 109 and imaging surface 118 which allows incident light 124 to pass through imaging surface 118.

Accordingly, to generate an accurate image of a fingerprint 135, fingerprint ridges 111 have relatively complete contact with imaging surface 118.

The fingerprint imaging system can utilize mirrors instead of a prism and can further comprise various other optional components as known in the art. For example, the fingerprint imaging system may further include electrodes disposed along a platen surface that can detect for example temperature or pulse, as described in US2010/0113952.

Figure 2:
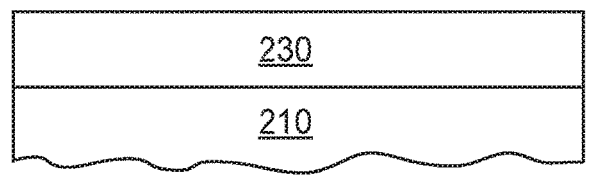
FIG. 2 is a schematic side view of an illustrative imaging surface of a fingerprint imaging system further comprising a self-wetting adhesive.

The presently described fingerprint imaging system comprises a self-wetting adhesive layer 230. The self-wetting adhesive is bonded to the imaging surface of an electronic optical image sensor. In one embodiment, the self-wetting adhesive layer 230 is bonded directly to prism 210, as depicted in FIG. 2.

The thickness of the self-wetting adhesive layer can vary. The thickness is typically at least 12.5 microns and no greater than 300 microns.

Figure 3:
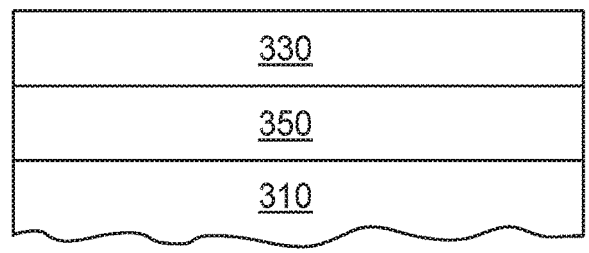
FIG. 3 is a schematic side view of an illustrative imaging surface of a fingerprint imaging system further comprising a rigid optically transparent platen.

In another embodiment, the imaging surface comprises a rigid optically transparent platen 350 that is typically comprised of a glass panel or a polymeric sheet to protect the prism 310. In this embodiment, the self-wetting adhesive layer 330 is typically bonded to the rigid optically transparent platen 350, as depicted in FIG. 3. The polymeric sheet material may include polyesters such as hard coated poly (ethylene terephthalate) (PET) and poly(ethylene naphthalate) (PEN); polyurethane (PU); polyolefins such as polyethylene (PE) and polypropylene (PP) composed of random polymers or syndiotactic PP; epoxy; and heat-curable acrylic polymers such as melamine containing polyacrylic mixtures.

Figure 4:
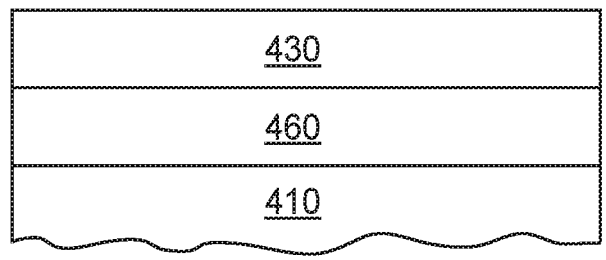
FIG. 4 is a schematic side view of an illustrative imaging surface of a fingerprint imaging system further comprises a conformable optically transparent polymeric layer.
Figure 5:
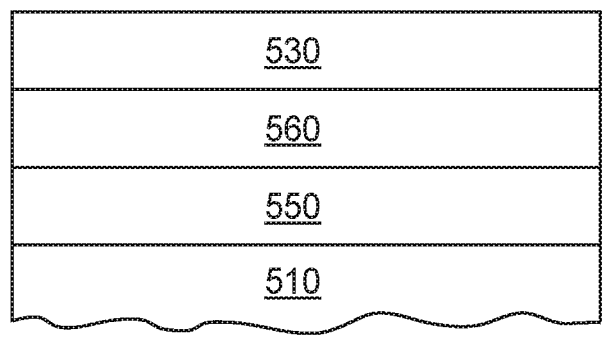
FIG. 5 is a schematic side view of an illustrative imaging surface of a fingerprint imaging system further comprising a rigid optically transparent platen and an optically transparent conformable polymeric layer.

In yet another embodiment, the imaging surface comprises a conformable optically transparent polymeric layer 460, most commonly a silicone sheet to protect the prism (410, 510). In yet another embodiment, the imaging surface may comprise a rigid optically transparent platen 550 in combination with a conformable optically transparent polymeric layer 560. In these embodiments, the self-wetting adhesive layer (430, 530) is typically bonded to the conformable optically transparent platen (460, 560) as depicted in FIGS. 4 and 5.

The self-wetting adhesive may be provided as a film, further comprising additional layers.

Figure 6:
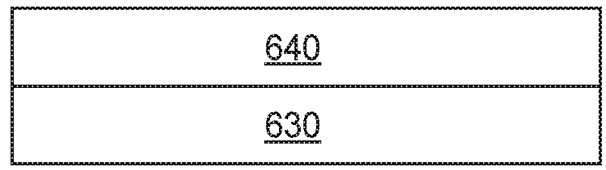
FIG. 6 is a schematic side view of a two-layer film comprising a self-wetting adhesive and a skin contact layer.

With reference to FIG. 6, film 600 suitable for use with a (e.g. fingerprint) imaging system comprises a self-wetting adhesive layer 630 and a skin contact layer 640.

The thickness of the skin contact layer can vary. The thickness is typically at least 12.5 microns and no greater than 300 microns.

Figure 7:
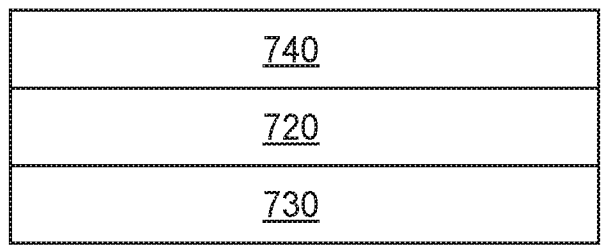
FIG. 7 is a schematic side view of a three-layer film comprising a self-wetting adhesive, a substrate, and a skin contact layer.

With reference to FIG. 7, film 700 preferably further comprises a substrate 720, such as a scrim or polymeric film disposed between the skin contacting layer 740 and self-wetting adhesive layer 730.

Figure 8:
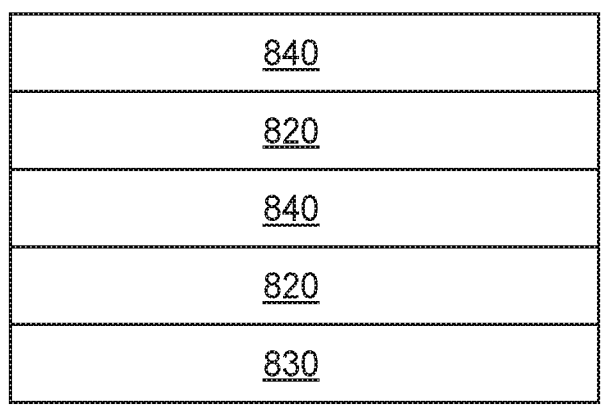
FIG. 8 is a schematic side view of a multi-layer film comprising at least two alternating layers of a skin contact layer or a self-wetting adhesive and a substrate.

With reference to FIG. 8, film 800 may comprises at least two alternating layers of a skin contact layer 840 and a substrate 820 and at least one layer of self-wetting adhesive 830.

The self-wetting adhesive is in contact with the imaging surface, as depicted in FIGS. 2-5

During use of the film of FIGS. 6-8 with a (e.g. fingerprint) imaging system, the self-wetting adhesive is in contact with the imaging surface.

The film, as well as each of the layers, i.e. the self-wetting adhesive, the skin contact layer, and substrate when present are optically transparent which mean that at least 85% of light from the light source of the fingerprint imaging system (typically visible lights ranging from 400 to 700 nm) passes through the film and thus each of the layers of the film. In some embodiments, the haze is no greater than 5, 4, 3, 2, or 1% (as determined by ASTM D1003)

The substrate typically has a thickness of at least 10 microns ranging to 500 microns. In some embodiments, the substrate thickness is no greater than 250 microns.

Suitable substrates include for example polycarbonate, acrylic polymer, polyolefin (e.g., polypropylene, polymethylpentene, or a cyclic polyolefin), polyamide (e.g., nylon 6), polyacetal, polyphenylene oxide, polyether sulfone, polystyrene, a polyether, a polyether ketone, a polyepoxide, a polyimide, or combinations thereof. Laminates of different types of polymers can also be employed to form the substrate.

In one embodiment, the substrate layer of the film comprises a "film grade" polyolefin such as low density polyethylene, ultra-low density polyethylene, low density polypropylene, and ultra-low density polypropylene.

The polyolefin utilized for the substrate layer preferably has a density selected based on the elasticity and toughness. Lower density will result in higher elasticity and less toughness whereas higher density will result in lower elasticity and higher toughness upon stretching in application. In some embodiments, the substrate layer has a higher density than the polyolefin polymer of the self-wetting adhesive. In some embodiments, the difference in density between the substrate layer and the self-wetting adhesive layer is at least 0.20, or 0.25, or 0.30, or even 0.35.

In some embodiments, the substrate layer typically comprises a random $C_2$-$C_3$ alkylene copolymer, a metallocene catalyzed linear low-density polyethylene or a substantially linear $C_2$-$C_3$ alkylene/α-olefin interpolymer, having a density of at least 0.880 g/cm$^3$, or 0.885, or 0.890 g/cm$^3$, or 0.895 g/cm$^3$.

The $C_2$-$C_3$ alkylene/α-olefin interpolymer is an interpolymer of ethylene, propylene, or a combination thereof, with at least one comonomer selected from $C_4$-$C_{20}$ α-olefins. The term "interpolymer" is used herein to indicate a random copolymer or a block copolymer, inclusive of grafted copolymers. Copolymer refers to a polymer prepared from at least two different alkylene monomers.

In some embodiments, the $C_2$-$C_3$ alkylene/α-olefin interpolymer typically comprise other comonomers such as non-conjugated dienes and cycloalkenes. Exemplary $C_4$-$C_{20}$ α-olefins include isobutylene, 1-butene, 1-hexene, 4-methyl-1-pentene, 1-heptene, and 1-octene. Preferred $C_4$-$C_{20}$ α-olefins include 1-butene, 1-hexene, 4-methyl-1-pentene, 1-heptene, and 1-octene, more preferably 1-hexene and 1-octene.

Substantially linear $C_2$-$C_3$ alkylene/α-olefin interpolymers are homogeneous interpolymers having long chain branching. Due to the presence of such long chain branching, substantially linear $C_2$-$C_3$ alkylene/α-olefin interpolymers are further characterized as having a melt flow ratio which may be varied independently of the polydispersity index, and the like, the molecular weight distribution $M_w/M_n$. This feature accords substantially linear $C_2$-$C_3$ alkylene/α-olefin interpolymers with a high degree of processability despite a narrow molecular weight distribution. Substantially linear ethylene/α-olefin interpolymers are available from the Dow Chemical Company as Affinity™ polyolefin plastomers and Engage™ and Infuse™ polyolefin elastomers.

When the substrate layer comprises a polyolefin film grade material that is a homopolymer or comprises very little comonomer, the density may be even greater than 0.895 g/cm$^3$. Further, a $C_2$-$C_3$ alkylene/α-olefin interpolymer having a density less than 0.880 g/cm$^3$ can be blended with a higher density polyolefin.

In some embodiments, the polyolefin polymer of the substrate layer comprises a higher content of ethylene, propylene, or a combination thereof, than the self-wetting adhesive layer. For example, the polyolefin polymer of the substrate layer may comprise ethylene, propylene, or combination thereof in an amount of at least 70, 75, 80, 85, 90 wt-% or greater. The polyolefin polymer of the substrate layer may optionally contain $C_4$-$C_{20}$ α-olefin(s) in amounts of no greater than 30, 25, 20, 15, 10, or 5 wt-% of the polyolefin polymer or the polyolefin polymer of the substrate layer may be substantially free of $C_4$-$C_{20}$ α-olefin(s).

The substrate layer typically comprises a "film grade" polyolefin polymer. Film grade polyolefin polymers typically have a melt flow index of at least 0.25, or 0.50, or 1.0, or 1.5 g/10 min., and in some embodiments at melt flow index of at least 2, 3, 4, 5, 6, 7, 8, 9, or 10 g/10 min. Film grade polyolefin polymers typically have a weight average molecular weight of at least 50,000 gram/mole, or 75,000 g/mole or 100,000 g/mole as measured by Gel Permeation Chromatography (GPC). Typically the weight average molecular weight is no greater than 500,000 or 400,000 g/mole.

The homogeneous $C_2$-$C_3$ alkylene/α-olefin interpolymers typically have a DSC melting point of at least 71.1° C. (160° F.) or 76.7° C. (170° F.), or 82.2° C. (180° F.), or 87.8° C. (190° F.), or 93.3° C. (200° F.). Other $C_2$-$C_3$ random copolymer may have a higher Differential Scanning Calorimetry (DSC) melt point of at least 95, 100, 105, 110, 115, 120, or 125° C. In some embodiments, the polyolefin utilized for the substrate layer has a (machine direction) tensile strength of at least 13.8 MPa (2000 psi), 20.7 MPa (3000 psi), 27.6 MPa (4000 psi), 34.5 MPa (5000 psi), 41.4 MPa (6000 psi), or 48.3 MPa (7000 psi). In some embodiments, the polyolefin utilized for the substrate layer has a (machine direction) elongation of at least 100%, 200%, 300%, 400%, or 500%.

In general the skin contact layer of the film is a material that conforms to the ridges and valleys of a finger. In some embodiments, the skin contact layer of the film may comprise the same types of material utilized for the conformable optically transparent polymeric layer 260. In this embodiment, the skin contact layer may comprise silicone, a polyurethane, or natural rubber. For example, in one embodiment the skin contact layer may comprise RTV (Room Temperature Vulcanization) liquid silicone manufactured by General Electric. RTV is a two-part clear liquid silicone that upon mixing vulcanizes at room temperature. In another embodiment, the skin contact layer may comprise a polymer layer that retains a fluid such as described in U.S. Pat. No. 6,154,285. Suitable polymers may include polyvinyl chloride (PVC), low density polyethylene (LDPE), poly (ethylene terephthalate) (PET) and poly(ethylene naphthalate) (PEN) or any combination thereof. The fluid is typically a plasticizer such as dioctyl phthalate (DOP), di(2-ethylhexyl) phthalate (DEHP), and/or dibutyl phthalate. In some embodiments, the polymer layer comprises at least 20, 25 or 30% by weight and typically no greater than 40, 50, or 60 or 70% plasticizer. However, in other embodiments, the skin contact layer is substantially free of fluid such as phthalate plasticizer. Thus, the concentration of material that is a liquid at ambient temperature (25° C.), such as a phthalate plasticizer is no greater than 1, 0.5, or 0.1 wt.-% of the skin contact layer.

Silicone-containing materials are relatively high in cost as compared to other polymeric materials such as polyolefin and polyester material. Thus, in some low cost embodiments, at least the skin contact layer and preferably the entire film is free of silicone (e.g. polyorgansiloxane). A low-cost film can be utilized as a single-use film, thereby preventing the spread of germs that can occur by repeatedly utilizing the same skin contact layer during fingerprint imaging.

In some embodiments, the skin contact layer comprises the same class of polyolefin materials as described for the substrate. In another embodiment, the skin contain layer can comprise a blend of a polyester, having an intrinsic viscosity ranging from about 0.5 to 0.7 with the same class of polyolefin materials as described for the substrate. The weight ratio of polyolefin to polyester can range from about 1:10 to about 10:1.

Various self-wetting adhesive compositions can be utilized, provided such material is sufficiently optically transparent, as previously described, and has the desired wet-out properties. As used herein the term "self-wetting" refers to an adhesive composition that can wet out the imaging surface at a rate no greater than 30 second/cm$^2$, according to the test method used in the examples where glass is used as a representative imaging surface. In embodiments, the self-wetting adhesive can wet out the imaging surface at a rate no greater than 20, 10, 5, or 1 s/cm$^2$. In preferred embodiments, the self-wetting adhesive can wet out the imaging surface at a rate no greater than 0.5 s/cm$^2$. In more preferred embodiment, the self-wetting adhesive can wet out the imaging surface at a rate no greater than 0.2 s/cm$^2$.

The self-wetting adhesive is preferably cleanly removable from the imaging surface with a relatively low removal force. For example, in some embodiments, the 180 degree peel force of the film is less than 30, 20, 10, 5, or 1 N/dm for a peel rate of 30.5 cm/min, as measured according to the test method used in the examples.

The self-wetting characteristic alone and preferable in combination with being cleanly removable at a low removal force facilitates quickly replacing the film.

The self-wetting adhesive layer may be any suitable adhesive. Non-limiting examples of adhesives include pressure sensitive adhesives, radiation curable adhesives, and the like. Examples of formulation types include solvent-based solutions, water-based latex, microspheres, hot melt coatable, and suitable combinations thereof.

Classes of useful self-wetting adhesives include, for example, (optionally tackified) natural rubbers or those based on synthetic rubbers, styrene block copolymers, polyvinyl ethers, acrylics (including both acrylates and methacrylates), polyurethanes, polyureas, poly-a-olefins, silicone resins, and the like. Combinations of self-wetting adhesives can be used. The self-wetting adhesive are typically considered pressure sensitive adhesives, generally meeting the Dahlquist criterion (G' of less than 0.3 MPa (i.e. 3×10$^6$ dynes/cm$^2$).

The self-wetting adhesive may be a polymer that is inherently tacky. If desirable, tackifiers may be added to a pressure sensitive adhesive base material to form the pressure sensitive adhesive.

In some embodiments, a primer layer may be utilized to enhance the bond between the self-wetting adhesive layer and the substrate. The type of primer will vary with the type of substrate and self-wetting adhesive used and one skilled in the art can select an appropriate primer. Examples of suitable primers include chlorinated polyolefins, polyamides, and modified polymers disclosed in U.S. Pat. Nos. 5,677,376, 5,623,010 and those disclosed in WO 98/15601 and WO 99/03907, and other modified acrylic polymers. Typically, primers are dispersed into a solvent at very low concentrations, e.g., less that about 5% solids, and coated onto the film, and dried at room or elevated temperatures to form a very thin layer. Typical solvents used may include water, heptane, toluene, acetone, ethyl acetate, isopropanol, and the like, used alone or as blends thereof.

The self-wetting adhesive layer and skin contact layer may be applied using any conventional technique known to those skilled in the art. For example, self-wetting adhesive layer and skin contact layer can be applied onto the film surface by coating, using for example a rotary rod die, slit die or gravure roll, or extrusion coating. The self-wetting adhesive layer is typically a continuous layer.

The self-wetting adhesive layer may optionally be protected with a release liner. The release liner is typically paper or film, which has been coated or modified with compounds of low surface energy relative to the adhesive applied. Organosilicone compounds, fluoropolymers, polyurethanes and polyolefins can serve this purpose. The release liner can also be a polymeric sheet produced from polyethylene, polypropylene, PVC, polyesters with or without the addition of low surface energy compounds.

In one embodiment, the self-wetting adhesive layer (e.g. of the film) comprises a silicone polyoxamide copolymer material such as described in U.S. Pat. No. 7,501,184 incorporated herein by reference.

Preferred silicone polyoxamide (or siloxane) copolymers, used in preparing the adhesive of the present invention, can be represented by the repeating unit (Formula I):

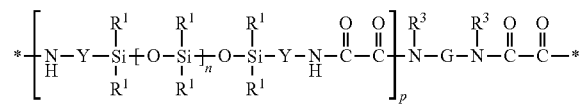

where:
each R$^1$ is independently an alkyl, haloalkyl, arylalkylenyl, alkenyl, aryl, or aryl substituted with an alkyl, alkoxy, or halo;
each Y is independently an alkylene, alkylarylene, or arylalkylene;

each G is independently alkylene, arylene, arylalkylene, alkylarylene, polyoxyalkyene, or polydiorganosiloxane;

$R^3$ is hydrogen or alkyl or $R^3$ taken together with G and with the nitrogen to which they are both attached forms a heterocyclic group;

n is independently in a range from 40 to 1500;

p is in a range from 1 to 10; and the asterisk (*) indicates a site of attachment of the repeat unit to another group in the copolymer, for example, another repeat unit of Formula I.

Such self-wetting adhesive typically further comprise a silicate tackifying resin. The silicate tackifying resins include those resins composed of the following structural units M ($R'_3SiO_{1/2}$ units), D ($R'_2SiO_{2/2}$ units), T ($R'SiO_{3/2}$ units), and Q ($SiO_{4/2}$ units), and combinations thereof. Typical examples include MQ silicone tackifying resins, MQD silicone tackifying resins, and MQT silicone tackifying resins. These preferably have a number average molecular weight of about 100 to about 50,000, more preferably about 500 to about 15,000 and generally have methyl substituents.

MQ silicone tackifying resins are copolymeric silicone resins having $R'_3SiO_{1/2}$ units ("M" units) and $SiO_{4/2}$ units ("Q" units). Such resins are described in, for example, *Encyclopedia of Polymer Science and Engineering*, vol. 15, John Wiley & Sons, New York, (1989), pp. 265-270, and U.S. Pat. No. 2,676,182 (Daudt et al.), U.S. Pat. No. 3,627,851 (Brady), U.S. Pat. No. 3,772,247 (Flannigan), and U.S. Pat. No. 5,248,739 (Schmidt et al.).

Certain MQ silicone tackifying resins can be prepared by the silica hydrosol capping process described in U.S. Pat. No. 2,676,182 (Daudt et al.) as modified according to U.S. Pat. No. 3,627,851 (Brady), and U.S. Pat. No. 3,772,247 (Flannigan). The modified process of Daudt et al. includes limiting the concentration of the sodium silicate solution, and/or the silicon-to-sodium ratio in the sodium silicate, and/or the time before capping the neutralized sodium silicate solution to generally lower values than those disclosed by Daudt et al. The neutralized silica hydrosol is preferably stabilized with an alcohol, such as 2-propanol, and capped with $R_3SiO_{1/2}$ siloxane units as soon as possible after being neutralized. It is important to note that the level of silicon bonded hydroxyl groups on the MQ resin may be reduced, preferably to less than about 1.5% by weight, more preferably to no greater than about 1.2 wt-%, even more preferably to no greater than about 1.0 wt-%, and most preferably to no greater than 0.8 wt-%. This may be accomplished, for example, by reacting hexamethyldisilazane with the silicone tackifying resin. Such a reaction may be catalyzed, for example, with trifluoroacetic acid. Alternatively, trimethylchlorosilane or trimethylsilylacetamide may be reacted with the silicone tackifying resin, a catalyst not being necessary in this case.

In another embodiment, the self-wetting adhesive layer may comprise a film grade polyolefin polymer, as previously described. Alternatively, the self-wetting adhesive layer may comprise a polylolefin polymer having a melt index greater than 100 g/10 min. The polyolefin material of the self-wetting adhesive layer typically has a density of less than 0.890 g/cm³, 0.880 g/cm³, or 0.870 g/cm³. In some embodiments, the density is at least 0.840 g/cm³ or 0.845 or 0.850 g/cm³. The polyolefin may have the same melt index range as the previously described polyolefin substrate. However, due to the higher concentration of (e.g. octene) α-olefin, the melting temperature may be less than 75° C., 70° C., 65° C., 60° C., 55° C., 50° C., 45° C., or 40° C. However, the melting temperature is typically at least 25° C. or 30° C. Such polyolefin is relatively soft and compliant in comparison to the substrate. For example, the Shore A hardness can be less than 90, 80, 70, or 60 (according to ASTM D2240). Further, the tensile strength can be less than 30, 25, 20, 15, 10, or 5 MPa.

The self-wetting adhesive layer may comprise a commercially available metallocene catalyzed linear low-density polyethylene (LLDPE) such as Exact 4151, Exact 0210, Exact 0230, Exact 8203 and Exact 8210 from ExxonMobil's EXACT™ plastomer. Alternatively, the self-wetting adhesive layer may comprise the previously described substantially linear $C_2$-$C_3$ alkylene/α-olefin interpolymer such as Dow Chemical's AFFINITY™ ethylene-containing plastomer series such as Affinity PL1850, Affinity PT 1450 and Affinity 8185; or Dow Chemical's ENGAGE™ ethylene-1-octene copolymers with different 1-octene contents as Engage® 8450, Engage® 8200 and Engage® 8842.

In some embodiments, the self-wetting adhesive layer may comprise a polyolefin polymer comprising at least 50 wt-% of ethylene, propylene, or combinations thereof. The polyolefin polymer of the adhesive layer further comprises one or more $C_4$-$C_{20}$ α-olefin, typically in an amount of at least 20, 25, 30, 35, 40, or 45 wt-%.

In some embodiments, the self-wetting adhesive layer may comprise polyisobutylene (e.g. lacking ethylene and or propylene) or a polyalphaolefin polymer having less than 50 wt-% of ethylene, propylene, or combinations thereof.

When the polyolefin polymer of the self-wetting adhesive layer comprises little or no additives, the adhesive layer may comprise the same or about the same density as the polymer. However, when the adhesive comprises other components, the density may be greater than or less than the polymer.

In another embodiment, the self-wetting adhesive layer may comprise a styrene block copolymer, such as a styrene-isoprene-styrene block copolymer. The molecular weight of the styrene block copolymer is typically at least 100,000; 150,000 or 200,000 g/mole (as measured by GPC) and typically no greater than 250,000 or 200,000 g/mole. The melt flow index may range from about 5 to 20 g/10 min. The styrene content is typically less than 25 or 20% and typically at least 5 or 10% styrene. The block copolymer typically has a sufficient amount of styrene-isoprene diblock, ranging from about 5 to 20%.

In other embodiments, the self-wetting adhesive is a urethane-based pressure sensitive adhesive as described for example in WO2010/132176; incorporated herein by reference, or a urea-based pressure sensitive adhesive as described for example in WO2009/085662; also incorporated herein by reference.

The self-wetting adhesive layer may optionally comprise up to 50 wt-% of additives and/or processing aids such as optically clear tackifying resins and plasticizers.

Various additives and processing aids are known in the art including for example processing aids, antioxidants, stabilizers, ultraviolet absorbers or stabilizers. It is appreciated that fillers that comprise encapsulated air can reduce the density of the composition relative to the polyolefin polymer alone.

In some embodiments, the skin contacting layer may function as an optically adaptive interface, such as described in US2012/0062364; incorporated herein by reference. An optically adaptive interface can be used to increase the contrast or enhance the fingerprint patterns between the skin site and skin contacting material. In this embodiment, the skin contact layer may further comprise a reflective layer such as a metal paint (e.g., silver, aluminum, bronze, titanium, titanium dioxide, etc.) disposed on the skin contact layer.

In some embodiments, the film comprises at least one release layer. The release layer may be a preformed substrate, commonly referred to as a release liner. Alternatively, the release layer may be a thermoplastic polymer optionally further comprising a silicone or fluorochemical release additive that is coextruded with the other requisite layers.

The release layer(s), whether provided as pre-formed films or coextruded with other layers during manufacture of the articles of the present invention, can be composed of polymers such as polyesters. Polyesters include carboxylate and glycol subunits and are generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. The term "polymer" when applied to polyesters will be understood to include both polymers and copolymers, as well as polymers or copolymers which may be formed in a miscible blend, for example, by coextrusion or by reaction, including, for example, transesterification. Also included within the term "polyester" are polycarbonates which are derived from the reaction of glycol monomer molecules with esters of carbonic acid, and blends of polycarbonates with copolyesters made from the above comonomers.

Suitable carboxylate monomer molecules for use in forming the carboxylate subunits of the polyester layers include, for example, terephthalic acid; 2,6-naphthalene dicarboxylic acid and isomers thereof; isophthalic acid; phthalic acid; azelaic acid; adipic acid; sebacic acid; norbornene dicarboxylic acid; bi-cyclooctane dicarboxylic acid; 1,6-cyclohexane dicarboxylic acid and isomers thereof, t-butyl isophthalic acid, tri-mellitic acid, sodium sulfonated isophthalic acid; 4,4-biphenyl dicarboxylic acid and isomers thereof; and lower alkyl esters of these acids, such as methyl or ethyl esters. The term "lower alkyl" refers, in this context, to $C_1$-$C_{10}$ straight-chained or branched alkyl groups.

Suitable glycol monomer molecules for use in forming glycol subunits of the polyester layers include ethylene glycol; propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; 2-butyl-2-ethyl-1,3-propane diol; 2,2,4-triethyl-1,3-pentane diol; norbornanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis(2-hydroxyethoxy)benzene.

Polyesters useful as release layer(s) are not particularly limited. Polyethylene terephthalate (PET) and copolymers of PET containing one or more additional carboxylate monomers and/or one or more additional glycol monomers can be advantageously used. Glycol modified PET, "PETG", which typically contains 1,4-cyclohexane dimethanol (CHDM) as a second glycol monomer, can be advantageously used.

When coextruded with other layers of the articles of the present invention, polyesters used for the release layer(s) can be selected so as to be coextrudable at similar temperatures to those required for the materials used for the other coextruded layers. These polyesters can also be selected so as to be capable of being quenched on a casting roll or drum to effectively avoid brittleness due to excessive crystallization. These polyesters can also be selected so as to provide good handling properties to the quenched film. Typically, good handling is ensured if the glass transition temperature, Tg, of the polyester is greater than 25° C., greater than 40° C., greater than 50° C., or even greater than 60° C.

In some embodiments, the self-wetting adhesive layer and skin-contact layer are formed by melt processing. In this embodiment, the optional substrate layer and/or release layer(s) may be provided as a preformed film. In another embodiment, the self-wetting adhesive layer, skin-contact layer, and substrate layer are formed by melt processing. In this embodiment, the release layer(s) may be provided as preformed release liner(s). In yet other embodiments, the adhesive layer, outer layer, substrate layer, and at least one or both release layers are formed by melt processing.

In one embodiment, a method comprises providing a skin-contact composition comprising a polyolefin polymer, providing a self-wetting adhesive composition comprising a polyolefin polymer and optionally further comprising a tackifying resin, providing a release composition that also functions as a substrate comprising a polyester polymer; and coextruding the skin-contact, adhesive, and release compositions to form a multilayer tape wherein the release composition is disposed between a skin-contact layer and the self-wetting adhesive layer As used herein, melt processing means the pumping and shaping of molten material into a structure. One melt processing technique useful in this invention is coextrusion. In the context of this specification, coextrusion means the simultaneous melt processing of multiple molten streams and the combination of such molten streams into a single unified structure, preferably from a single extrusion die. When a single die is used, the streams of molten material are not required to exit the die from a single outlet. The molten streams can be joined together in a feedblock, in the die, or outside the die. If the streams are joined in the die, they can come together upstream of the exit orifice (a common land die) or at the exit orifice (a zero common land die). In all cases, however, the streams are joined or combined together prior to entering the die, or in the die, or in proximity to the outlet of the die.

Useful compositions for melt processing are fluid or pumpable at the temperatures used to melt process the film or tape. Furthermore, these compositions preferably do not significantly degrade or gel at the temperatures employed during melt processing. Useful compositions also typically have a melt viscosity of from 500 cPs to 1,000,000 cPs at the extrusion temperature. As used herein, the term melt viscosity means the viscosity of the molten material at the shear rate and processing temperature employed.

The layers can be extruded sequentially or coextruded. See for example, U.S. Pat. No. 5,660,992 and U.S. Pat. No. 4,379,806; incorporated by reference. A feedblock is used to combine the molten streams into a single flow channel. The distinct layers of each material are maintained at this time because of the laminar flow characteristics of the streams. The feedblock delivers or transports the now unified, molten structure to an extrusion die where it is reduced in height and increased in width so as to provide a relatively thin and wide construction.

The extruders are in effect "pumps" for delivery of the molten streams to the extrusion die. The precise extruder employed is not critical to the process. However, it is understood that the design of the extruder screw will influence the ability of the extruder to provide good melt quality, temperature uniformity, throughput and the like. A number of useful extruders are known and include single and twin screw extruders, batch-off extruders and the like. These extruders are available from a variety of vendors including Davis-Standard Extruders, Inc. (Pawcatuck, Conn.), Black Clawson Co. (Fulton, N.Y.), Berstorff Corp (N.C.), Farrel Corp. (Conn.), Moriyama Mfg. Works, Ltd. (Osaka, Japan).

Other "pumps" may also be employed to deliver the molten streams to the extrusion die. They include drum unloaders, bulk melters, gear pumps, etc. These are available from a variety of vendors, including Graco LTI (Monterey, Calif.), Nordson (Westlake, Calif.), Industrial Machine Manufacturing (Richmond, Va.), Zenith Pumps Div., Parker Hannifin Corp., (N.C.).

Once the molten streams have exited the pump, they are typically transported to the die through transfer tubing and/or hoses. It is preferable to minimize the amount of residence time in the tubing so as to avoid problems of, for example, melt temperature variations. This can be accomplished by a variety of techniques, including minimizing the length of the tubing, providing appropriate temperature control of the tubing, and utilizing static mixers in the tubing to maintain a homogeneous temperature in the tubing.

The use of a feedblock is optional as a variety of coextrusion die systems are known. Thus, for example, multimanifold dies may also be employed. Examples of feedblocks and extrusion dies useful in the invention are the Cloeren "Vane" dies and Cloeren coextrusion feedblocks and multimanifold dies available commercially from The Cloeren Company of Orange, Tex. Such dies are described in, for example, U.S. Pat. Nos. 4,152,387; 4,197,069; 4,600,550; 4,619,802; 4,780,258; and 4,789,513. Other coextrusion dies and feedblocks are available from Extrusion Dies Inc. (Chippewa Falls, Wis.), ER-WE-PA (GA), Egan Machinery Division, John Brown Inc. (NJ), and Welex Inc. (PA).

The resulting film or tape can be wound as an output roll. When the tape has a release liner in contact with the outer layer, the release layer-can be removed such that the tape is wound on the release liner that contacts the adhesive layer. The liner can be recovered and recycled if desired. Alternatively, is some embodiments, both release liners can be removed. Desired widths and/or lengths of the tape can then be cut using techniques known to the art.

In some embodiments, a pre-made release liner is used to contact the surface of a casting wheel and is interposed between the surface of the casting wheel and the molten stream in which adhesive layer is coextruded against the release liner. However, the use of a liner in the process is optional depending on the relative location of the adhesive layer, i.e. air side or wheel side. For example, a molten structure comprising of a release layer, an adhesive layer, and a substrate layer can be deposited directly onto the surface of casting wheel with the substrate layer contacting the casting wheel surface.

The casting wheel is typically maintained at a temperature less than the temperature of the unified molten structure. Typically this is a temperature in the range of from 5 to 100° C., preferably in the range of 20-80° C.

An air knife or electrostatic pinning device may be used to force the molten unified structure against the liner if desired.

EXAMPLES

Samples of self-wetting, compressible, and transparent film for fingerprint scanners were assembled. The samples were characterized along with comparative films via the following test methods to establish wet out and peel performance.

Materials Used in the Examples

TABLE 1

| Materials | |
|---|---|
| Trade Designation or Abbreviation (Supplier) | Description |
| Exact 8203 (Exxon Mobil of Irving, TX) | Ethylene octene copolymer with plastic and elastomeric properties reported to have a density of 0.882 g/cc.. |
| ENGAGE ™ 8842 Polyolefin Elastomer (Dow ® Chemical Company of Midland, MI) | Ultra low-density ethylene octene copolymer reported to have a density of 0.857 g/cc. |
| Silicone Polyoxamide Adhesive (3M Company of St. Paul, MN) | Prepared according to Example 16 of U.S. Pat. No. 7,501,184, reported to have a Shore A hardness of 28 |
| Polypropolyene (PP) ATOFINA 8650 (Total Petrochemicals, Inc. of Houston, TX) | High ethylene random copolymer reported to have a density of 0.890 g/cc. |
| PET1 | Polyethylene terephthalate thermoplastic polymer resin having an intrinsic viscosity of 0.60. |
| Melinex PET (Dupont Teijin Films of Chester, VA) | Biaxially oriented polyester film. |
| Jeffamine D2000 (Huntsman Corporation of The Woodlands, TX) | Difunctional primary amine—polyetheramine. |
| Urea (PCA Sales of Lima, OH) | Organic carbamide with a carbonyl attached to two organic amines. |
| Sartomer SR399 (Sartomer Americas of Exton, PA) | Dipentaerythritol pentaacrylate |
| Irganox 1035 (BASF of Basel, Switzerland) | Thiodiethylene bis[3-(3,5-di-tert.-butyl-4-hyrdoxy-phenyl)propionate] Sulfur containing (phenolic) antioxidant and heat stabilizer. |
| Irgacure ® 4265 (BASF of Basel, Switzerland) | Photoinitiator blend: 2-Hydroxy-2-methyl-1-phenyl-propan-1-one-2,4,6-Trimethylbenzoyldiphenyl-phosphine oxide mixture. |
| Quintac 3620 (Zeon Chemicals | Thermoplastic elastomer with Styrene-isoprene block copolymer, Molecular Weight 230,000 g/mole, Melt Flow 9 g/10 min, 14% styrene, 12% diblock |

Test Methods

Wet Out

A pre-cleaned Fisherbrand plain microscope glass slide with dimensions 7.5 cm×2.5 cm×1.0E-1 cm (3 in×1 in×4.0E-2 in) obtained from Fisher Scientific of Loughborough, United Kingdom was held and dropped, at an angle of 21 degrees relative to the perpendicular of the surface of the Earth, onto a sample self-wetting film surface. The time to wet out (i.e., become uniformly wet) the glass slide was recorded in seconds and divided by the area of wet out: 19.35 cm$^2$ (3 in$^2$). The test was performed three times for each sample and the average was recorded.

Peel Adhesion

Test samples were prepared by placing a 12.2 cm (4.8 in) wide by 178 cm (70 in) length self-wetting film tape on a 100 cm×250 cm (39.37 in×98.43 in) glass panel, which was cleaned by an isopropanol wipe. The tape was rolled down onto the glass panel with two passes of a 2 kg roller. The test followed the ASTM D 3330-78 PSTC-1 (11/75) protocol and was conducted on a SP-2100 Slip/Peel Tester obtained from Instumentors Inc., of Strongsville, Ohio. The film tape was removed from glass panel at a peel angle of 180 degrees and at a rate of 30.48 cm/min (12 in/min) for a total of ten seconds. The force required to remove the film tape was measured and the average of three tests for each sample of self-wetting film tape was recorded.

Example Sample Assembly

Two 27 mm Leistrich twin screw extruders obtained from Liestrich of Nürnberg, Germany and a 25 mm Bernstoff twin screw extruder obtained from KraussMaffei Berstoff of Hannover, Germany were connected to a three-layer feedblock with skin blocks by using 1.27 cm (0.5 in) nectubes. With the skin blocks connected, a three-layer adhesive, substrate, and skin contact configuration was achieved. The adhesive and substrate layers were fed by the 27 mm Leistrich twin screw extruders and the 25 mm Bernstoff twin screw extruder fed the skin contact layer. 2.7 cm (1.01 in)×2.7 cm (1.01 in) samples were constructed and are described in Table 2. Thicknesses of each of the layers is also highlighted in Table 2. The materials utilized for each layer is reported in Table 1. Two 3M™ VentureShield™ Paint Protection Film 7510 CS-LD samples were used as comparative examples and were obtained from 3M™ Company of St. Paul, Minn. A summary of the sample layers is represented in Table 2 and results of the testing are found in Table 3.

TABLE 2

| Layer | E1 | E2 | E3 | E4 | E5 | CE1 |
|---|---|---|---|---|---|---|
| Adhesive Material | Silicone Polyoxamide | EXACT 8203 | ENGAGE 8842 | ENGAGE 8842 | Silicone Polyoxamide | PSA |
| Adhesive Thickness (microns) | 50.8 | 50.8 | 50.8 | 50.8 | 50.8 | 50.8 |
| Substrate | PET | PET | PET | PP 8650 | PP 8650 | Urethane |
| Substrate Thickness (microns) | 127 | 127 | 127 | 127 | 127 | 127 |
| Skin Contact Layer | PP 8650 | 10% (by mass) PP 8650/90% (by mass) PET1 | 10% (by mass) PP 8650/90% (by mass) PET1 | PET1 | PP 8650 | None |
| Skin Contact Layer Thickness (microns) | 127 | 127 | 127 | 127 | 127 | 127 |

TABLE 3

| Example | Average Wet Out (s/cm²) | Average Peel (N/dm) |
|---|---|---|
| E1 | 0.100 | 0.737 |
| E2 | 0.906 | 0.760 |
| E3 | 0.564 | 0.813 |
| E4 | 0.464 | 1.030 |
| E5 | 0.104 | 0.660 |
| CE1 | 74.40 | 63.50 |

The following examples describe the preparation and testing of two self-wetting adhesive assemblies directly affixed on electronic optical image sensors.

Example 6 (E6)

Preparation

Step 1: To a vessel equipped with a mechanical stirrer was added 200 parts of Jeffamine D2000, followed by 4.8 parts of urea. The vessel was sealed, except for a slow nitrogen purge bubbling through the liquid and out of the vessel. The reaction was heated at 160° C. for 24 hours. The resulting oligomeric diamine solution was cooled to 50° C. and 29.5 parts ethyl acetate, 14.4 parts Isopropyl alcohol, and 9.9 parts 1-methoxy-2-propanol were added and stirred for 30 minutes. The solution was brought to 25° C., blanketed with atmosphere air, and 8.71 parts 2-Isocyanatoethyl methacrylate was added. Sartomer SR399 (24 parts), Irganox 1035 (0.8 parts), Benzophenone (1.33 parts), hyroquinone (0.06 parts), ethyl acetate (5 parts), Darocur 4265 (6.7 parts), tripropylene glycol diacrylate (24 parts) and isopropyl alcohol (35 parts) were added to the solution with agitation. Step 2: To a container was charged 601.7 parts of the mixture prepared in Step 1 and 188.3 parts isopropylmyristate. The container was sealed then shaken for 5 hours. Step 3: To a container was charged 71.9 parts of the mixture prepared in Step 1, 78.8 parts isopropylmyristate, 172.24 parts of a pressure sensitive adhesive solution having a composition of Isooctyl acrylate/methyl acrylate/acrylic acid 57.5/35/7/5 at 25.6% solids in ethyl acetate/toluene 73/27 prepared, as described in Ulrich RE 24,906, 10.8 parts ethyl acetate, 13.5 parts isopropyl alcohol, and 2.7 parts 1-methoxy-2-propanol. The container was sealed then shaken for 5 hours.

Step 4: The formulation created in Step 2 was cast onto a 5 mil clear Melinex PET film using a knife die handspread coater to a thickness appropriate for the test to be run on the sample. The coating was dried in an oven at 65° C. for 5 minutes, resulting in a dried thickness of 25.4 microns. The dried coating was cured in a nitrogen atmosphere under high intensity UV exposure using an H-bulb Fusion UV lamp obtained from Heraeus Noblelight America LLC of Gaithersburg, Md. The open face of the coating was covered with a 1 mil PET film.

Step 5: The formulation created in Step 3 was cast onto the non-coated side of the film created in Step 4 using a knife die handspread coater to a thickness appropriate for the test to be run on the sample. The coating was dried in an oven at 65° C. for 5 minutes, resulting in a dried thickness of 1 mil. The dried coating was cured in a nitrogen atmosphere under high intensity UV exposure using an H-bulb Fusion UV lamp obtained from Heraeus Noblelight America LLC of Gaithersburg, Md. The final dried and cured product contained about 68 wt-% of polyureaacrylate, 14 wt-% of the PSA, 7.75 wt-% of polymerized units derived from SR399, and 7.75 wt-% of polymerized units derived from TPGDA. The open face of the coating was covered with a 25.4 microns silicone release liner.

Example 7 (E7)

Preparation

Step 1: To a container was charged 16.9 parts Quintac 3620 styrene-isoprene block copolymer, 5.6 parts isopropylmyristate, 0.2 parts Irganox 1010, 42 parts toluene, and 11 parts methylethyl ketone. The container was sealed then shaken for 24 hours. Step 2: The formulation created in Step 1 was cast onto the non-coated side of the film created in Step 4 of E6 using a knife die handspread coater to a thickness appropriate for the test to be run on the sample. The coating was dried in an oven at 65° C. for 5 minutes, resulting in a dried thickness of 3 mil. The open face of the coating was covered with a 1 mil silicone release liner.

Testing

The second coated side (from Step 5 in E6 and Step 2 in E7) of the self-wetting adhesive assemblies were applied on top of the imaging glass side of CS500e Scanner obtained from 3M Company of St. Paul, Minn. after the silicone release liner was peeled off. Then, the first coated side (from Step 4 in E6) was exposed by removing the 1 mil PET film. Wet out and peel adhesion were tested and are represented in Table 3.

TABLE 3

| Example | Average Wet Out (s/cm$^2$) | Average Peel (N/dm) |
|---|---|---|
| E6 | 4.90E−1 (0.49) | 7.33E−1 (0.73) |
| E7 | 1.97E−1 (0.20) | 2.70E−1 (0.27) |

What is claimed is:

1. A fingerprint imaging system comprising a film comprising an optically transparent self-wetting adhesive layer adhered to an imaging surface of an electronic optical image sensor, said self-wetting adhesive comprising at least one of the following: a polydiorganosiloxane polyurea copolymer or polydiorganosiloxane polyoxamide copolymer, a C2-C3 alkylene/a-olefin copolymer, a styrenic block copolymer.

2. The fingerprint imaging system of claim 1 wherein the self-wetting adhesive wets out the imaging surface at a rate no greater than 30, 20, 10, 5, or 1 second/cm$^2$.

3. The fingerprint imaging system of claim 1 wherein the self-wetting adhesive is cleanly removable from the imaging surface with a 180 degree peel force of less than 30, 20, 10, 5, or 1 N/dm for a peel rate of 30.5 cm/min.

4. The fingerprint imaging system of claim 1 wherein the film further comprises an optically transparent substrate layer having a major surface adhered to the self-wetting adhesive.

5. The fingerprint imaging system of claim 1 wherein the film further comprises a skin contact layer having a different composition than the self-wetting adhesive disposed on the self-wetting adhesive.

6. The fingerprint imaging system of claim 1 wherein the electronic optical image sensor comprises a lens array comprising lenses, mirrors, or a prism.

7. The fingerprint imaging system of claim 6 wherein the imaging surface further comprises a rigid optically transparent platen disposed between the lens array and the self-wetting adhesive.

8. The fingerprint imaging system of claim 7 wherein the self-wetting adhesive is adhered to the prism or rigid optically transparent platen.

9. The fingerprint imaging system of claim 8 wherein the imaging surface further comprises a conformable optically transparent polymeric layer disposed between the prism and the self-wetting adhesive or disposed between the rigid optically transparent platen and the self-wetting adhesive.

10. The fingerprint imaging system of claim 4 wherein the substrate layer comprises a polymeric film.

11. The fingerprint imaging system of claim 10 wherein the substrate layer further comprises a release additive.

12. The fingerprint imaging system of claim 1 wherein the self-wetting adhesive is a urea-based Pressure Sensitive Adhesive (PSA).

13. The fingerprint imaging system of claim 5 wherein the skin contact layer comprises a polyolefin material, a polyester material, or a mixture thereof.

14. The fingerprint imaging system of claim 5 wherein the film further comprises an additional layer of the same composition as the skin contact layer and an additional self-wetting layer, said additional layers disposed between the self-wetting adhesive layer and the skin contact layer.

15. A method of use of an optical imaging system comprising:
providing a film comprising a self-wetting adhesive; and adhering the self-wetting adhesive to an imaging surface of an optical image sensor, said self-wetting adhesive comprising at least one of the following: a polydiorganosiloxane polyurea copolymer or polydiorganosiloxane polyoxamide copolymer, a C2-C3 alkylene/a-olefin copolymer, a styrenic block copolymer.

16. The method of claim 15 wherein the self-wetting adhesive wets out the imaging surface at a rate no greater than 30, 20, 10, 5, or 1 second/cm$^2$.

17. The method of claim 15 further comprising contacting a person's finger or other body site with the skin contact layer or self-wetting adhesive.

18. The method of claim 15 further comprising replacing the film after a first person and before a second person.

19. The method of claim 17 further comprising removing at least the layer contacted by the person's finger after a first person and before a second person.

20. The fingerprint imaging system of claim 5, wherein the film further comprises an optically transparent substrate disposed between the self-wetting adhesive and skin contact layer.

21. The fingerprint imaging system of claim 5 wherein the film further comprises a removable release liner in contact with the self-wetting adhesive layer.

22. The fingerprint imaging system of claim 4 wherein the film further comprises at least an additional self-wetting adhesive layer and an additional substrate layer thereby forming a multilayer film comprising a repeating stack of a self-wetting adhesive layer and a substrate layer wherein at least one substrate layer comprises a release agent and one of the self-wetting adhesive layers adheres to the imaging surface.

23. The fingerprint imaging system of claim 5 wherein the film further comprises at least an additional layer having the same composition as the skin contact layer and an additional substrate layer thereby forming a multilayer film comprising a repeating stack of a layer having the composition of the skin contact layer and a substrate layer wherein the substrate layer comprises a release agent.

24. The fingerprint imaging system of claim 23 wherein the multilayer film comprises a self-wetting adhesive layer.

25. The method of claim 15 wherein the self-wetting adhesive is cleanly removable from the imaging surface with a 180 degree peel force of less than 30, 20, 10, 5, or 1 N/dm for a peel rate of 30.5 cm/min.

26. The method of claim 15 wherein the film further comprises an optically transparent substrate layer having a major surface adhered to the self-wetting adhesive.

27. The method of claim 15 wherein the film further comprises a skin contact layer having a different composition than the self-wetting adhesive disposed on the self-wetting adhesive.

28. The method of claim 15 wherein the electronic optical image sensor comprises a lens array comprising lenses, mirrors, or a prism.

29. The method of claim 28 wherein the imaging surface further comprises a rigid optically transparent platen disposed between the lens array and the self-wetting adhesive.

30. The method of claim 29 wherein the self-wetting adhesive is adhered to the prism or rigid optically transparent platen.

31. The method of claim 30 wherein the imaging surface further comprises a conformable optically transparent polymeric layer disposed between the prism and the self-wetting adhesive or disposed between the rigid optically transparent platen and the self-wetting adhesive.

32. The method of claim 26 wherein the substrate layer comprises a polymeric film.

33. The method of claim 32 further comprising a release additive.

34. The method of claim 27 wherein the self-wetting adhesive is a urea-based Pressure Sensitive Adhesive (PSA).

35. The method of claim 27 wherein the skin contact layer comprises a polyolefin material, a polyester material, or a mixture thereof.

36. The method of claim 27 wherein the film further comprises an additional layer of the same composition as the skin contact layer and an additional self-wetting layer, said additional layers disposed between the self-wetting adhesive layer and the skin contact layer.

* * * * *